United States Patent [19]
Sim

[11] Patent Number: 5,832,725
[45] Date of Patent: Nov. 10, 1998

[54] DEVICE FOR REDUCING AIR POLLUTING EMISSIONS FROM VEHICLES

[75] Inventor: Hyunsung Sim, Anyang-si, Rep. of Korea

[73] Assignee: Hyundai Motor Company, Seoul, Rep. of Korea

[21] Appl. No.: 573,633

[22] Filed: Dec. 18, 1995

[30] Foreign Application Priority Data

Dec. 30, 1994 [KR] Rep. of Korea ...................... 94-39718
Jul. 29, 1995 [KR] Rep. of Korea ...................... 95-23036
Aug. 7, 1995 [KR] Rep. of Korea ...................... 95-24316

[51] Int. Cl.⁶ ................................................. F01N 3/00
[52] U.S. Cl. .................. 60/289; 60/289; 60/305
[58] Field of Search ............................ 60/294, 305, 289; 137/625.11, 883

[56] References Cited

U.S. PATENT DOCUMENTS

| | | | |
|---|---|---|---|
| 2,812,753 | 11/1957 | Zubaty | 137/625.11 |
| 3,364,677 | 1/1968 | Ernst | 60/305 |
| 3,380,245 | 4/1968 | Mick | 60/305 |
| 3,406,515 | 10/1968 | Behrens | 60/305 |
| 3,480,040 | 11/1969 | Erickson | 137/883 |
| 3,641,767 | 2/1972 | Kraus | 60/305 |
| 3,742,712 | 7/1973 | Garcea | 60/305 |
| 3,906,722 | 9/1975 | Garcea | 60/293 |
| 5,333,446 | 8/1994 | Itoh | 60/289 |
| 5,400,591 | 3/1995 | Aramaki | 60/290 |

FOREIGN PATENT DOCUMENTS

| | | | |
|---|---|---|---|
| 224732 | 11/1986 | European Pat. Off. | 60/294 |
| 928299 | 6/1963 | United Kingdom | 137/625.11 |

*Primary Examiner*—Thomas E. Denion
*Attorney, Agent, or Firm*—Finnegan, Henderson, Farabow, Garrett, & Dunner L.L.P.

[57] ABSTRACT

The invention provides a device which supplies the time resolved secondary air according to the exhaust valve timing of each cylinder at desired time and in desired amount while the engine is cold so as to enhance the mixing and achieves sufficient oxidation of exhaust gases, as a result, to reduce emissions. The device includes, an air compressor for producing the secondary air; a distributor for distributing the secondary air to an exhaust system for a cylinder in the exhaust stroke, connected to the exhaust system by a distributing means; and a timing means for operating the distributor while an exhaust valve of the cylinder is open according to the exhaust valve timing of the cylinder following the sequence of engine combustion.

4 Claims, 7 Drawing Sheets

DEVICE FOR REDUCING AIR POLLUTING EMISSIONS FROM VEHICLES

BACKGROUND OF THE INVENTION

1. Field of the Invention

The invention relates to a device for reducing air polluting emissions in vehicles, more particularly, to a device which supplies the time-resolved secondary air to an exhaust system according to exhaust valve timing of each cylinder at desired time and for desired duration to achieve sufficient oxidation of exhaust gases for reducing emissions.

2. Description of the Prior Art

Since exhaust gases from engine cylinders contain air polluting gases including hydrocarbons (HC), carbon monoxide (CO) and nitrogen oxides (NOx), it is needed to reduce such air polluting emissions.

In particular, a great quantity of emissions are exhausted when the engine is in cold state.

Nowadays, several ways of reducing the great quantity of emissions have been studied and a device which supplies the secondary air to an exhaust manifold and prompts oxidation of incomplete combustion gases has been examined.

The device is illustrated in FIG. 6, and includes an engine 101. The numeral 104 is an electronic control unit (ECU), and an oxygen sensor 102 and a fuel injector 108 are provided in an exhaust pipe 100 and an intake manifold 106, respectively.

Also an air nozzle 114 for supplying the secondary air to an exhaust manifold 112, operated by an air pump (not shown), and a catalytic converter 110 are shown.

The ECU 104 receives a signal from the oxygen sensor 102 and controls the injector 108 to properly adjust the air to fuel ratio.

However, if the engine is cold, the oxygen sensor 102 does not work and the injector 108 is controlled by the mapped ECU program according to the engine RPM, coolant temperature, intake air etc to adjust the air to fuel ratio.

At this time, the air nozzle 114 continuously injects the secondary air to the exhaust manifold and the exhaust gases are mixed with the secondary air and oxidation of the incomplete combustion exhaust gases is prompted, thus resulting in reduced emissions.

However, the above device is not highly effective because the supply of the secondary air is continuous whereas the exhaust gases are emitted only when each exhaust valve is open, i.e., in the exhaust stroke of each cylinder, and the pressure wave caused by opening or shutting off of the exhaust valves prevents uniform mixing.

Moreover, the conventional device does not take into consideration of the engine condition, that means, the secondary air can not be compensated in accordance with the engine RPM or engine load because it supplies the secondary air without taking into consideration of the amount of exhaust gases.

SUMMARY OF THE INVENTION

The invention has been made in an effort to solve the above problems.

It is a primary object of the invention to provide a device which supplies the secondary air according to the exhaust valve timing of each cylinder at desired time and in desired amount when the engine is cold to enhance mixing and sufficient oxidation of exhaust gases to reduce emissions.

It is another object of the invention to provide a device which compensates the secondary air in accordance with the engine condition.

Accordingly, the invention provides a device for reducing emissions which includes an air compressor for producing the secondary air, a distributor for distributing the secondary air to an exhaust system for a cylinder in the exhaust stroke, connected to the exhaust system by a distributing means, and a timing means for operating the distributor when an exhaust valve of the cylinder is open according to the exhaust valve timing of the cylinder following the sequence of engine combustion.

Also the invention provides a device for reducing emissions in vehicles including an air compressor for producing the secondary air, a plurality of injectors for injecting the secondary air to an exhaust system for a cylinder in exhaust stroke, each of which is arranged in a corresponding connection, which is one of the connections for connecting a passage, in which the secondary air produced in the air compressor flows, to each exhaust system, each connection being diverged from the passage, and a control unit for operating the respective injector while an exhaust valve of the cylinder is open according to the exhaust valve timing of the cylinder following the sequence of engine combustion.

It is possible for the above device to further include a pressure control valve and check valves for controlling the pressure control valve for compensating the secondary air according to the engine condition and for preventing rearward flow of exhaust gases to distributing means, respectively.

DETAILED DESCRIPTION OF A PREFERRED EMBODIMENT

Now, a preferred embodiment of the invention, only an example which the invention is applied, will be explained in more details with reference to the drawings.

Figure 1:
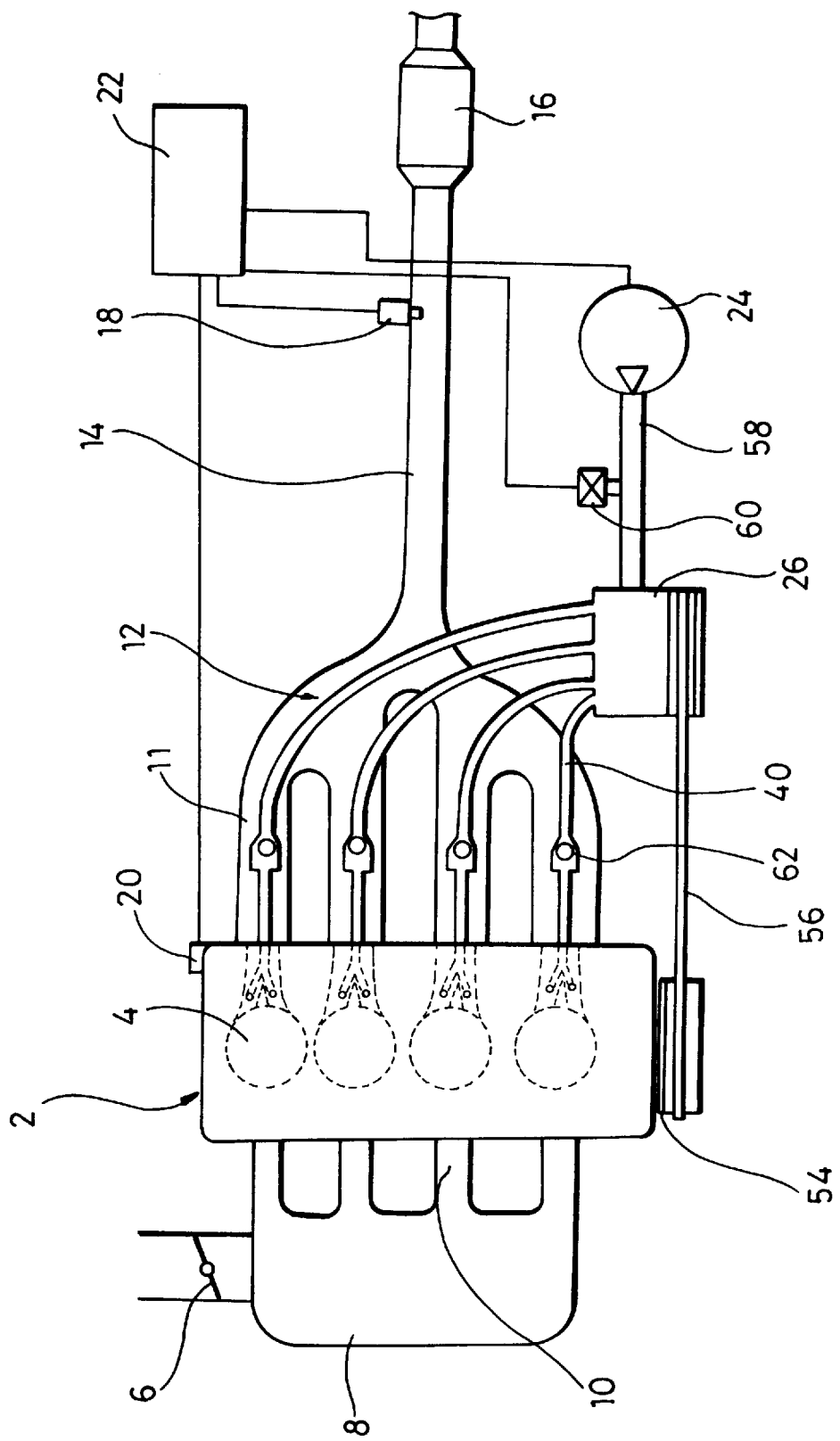
FIG. 1 is a plan view showing an engine system to which a first preferred embodiment according to the invention is applied.

FIG. 1 shows a plan view of the engine system to which an embodiment is applied where numeral 2 refers to an engine.

The engine 2 includes a multiplicity of cylinders 4 and is provided with an induct system and an exhaust system.

The induct system includes a throttle valve 6, surge tank 8, and intake manifold 10. The air from an air cleaner (not shown) is flowed to the surge tank 8 through the throttle valve 6 and are supplied to each of cylinders 4 through the intake manifold 10.

In the exhaust system, exhaust gases are emitted through an exhaust manifold 12 and then, an exhaust pipe 14, and a catalytic converter 16 provided in the exhaust pipe 14 promotes oxidation.

An oxygen sensor 18 arranged in the exhaust pipe and before the catalytic converter 16, for sensing the amount of oxygen contained in the exhaust gases, and a coolant temperature sensor 20 for sensing the coolant temperature are electronically connected to an electronic control unit (ECU) 22.

The ECU 22 controls fuel injectors (not shown), each of which is arranged at the end position of the intake manifold, to properly adjust an air to fuel ratio according to the signals from the sensors.

In the engine system which has the above construction, an embodiment according to the invention is applied and operated as follows. It should be noted that the engine system is only an example to which an embodiment of the invention is applied, and the scope which the invention is applied is not limited to it.

A distributor 26 supplies the secondary air, produced in an air compressor 24, to the exhaust system in accordance with the exhaust valve timing of each cylinder, that means, the distributor 26 sequentially supplies (or distributes) the secondary air to the exhaust system with respect to the cylinder, as, for example, a branch of the exhaust manifold, at the exhaust stroke while the corresponding exhaust valve is open.

Figure 2:
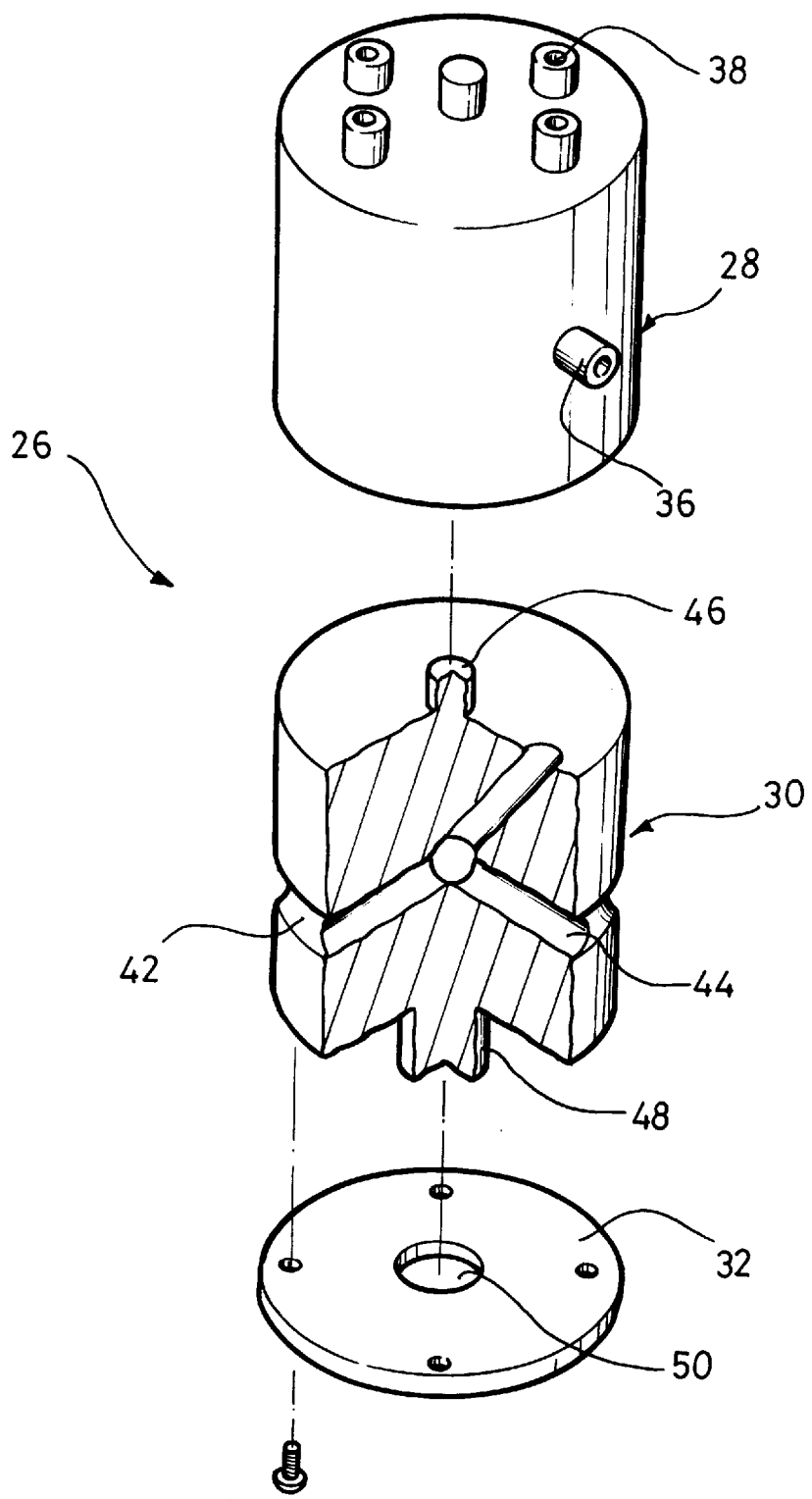
FIG. 2 is an exploded perspective view of a distributor of the above embodiment.
Figure 3:
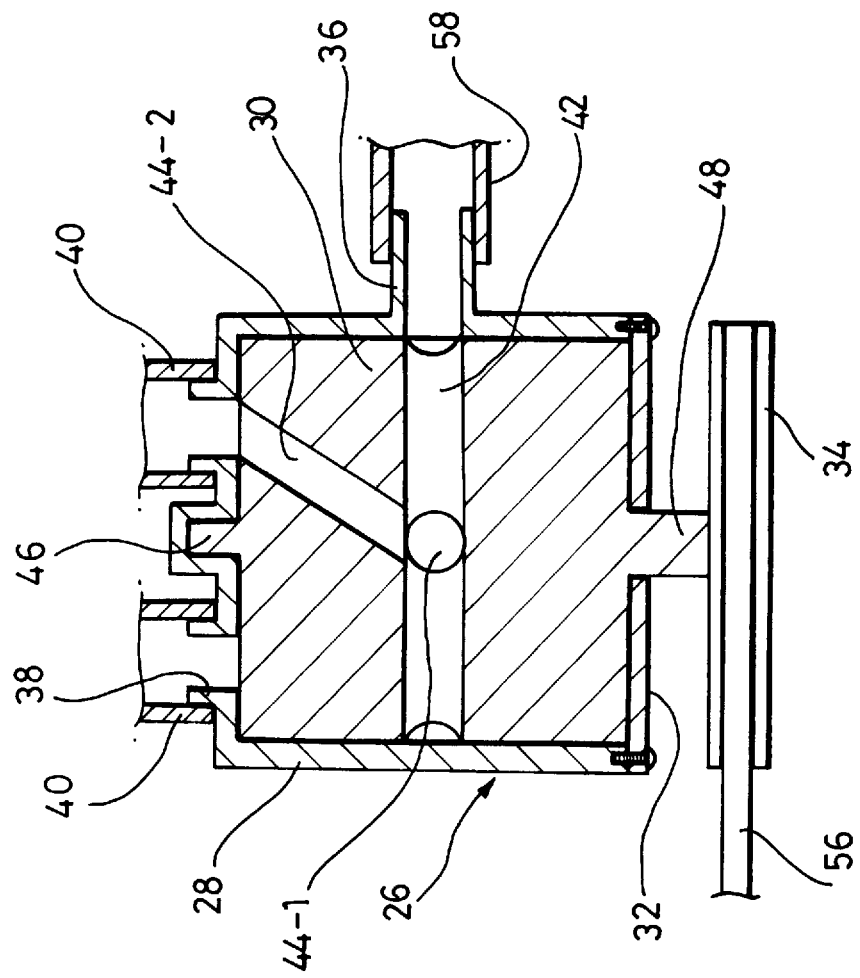
FIG. 3 is a sectional view of the above distributor.

The distributor 26 includes a housing 28, a rotating body 30, and a lower cover 32, and is connected with a pulley 34 as shown in FIGS. 2 and 3.

The housing 28 may be a cylindrical member, of which one end is open, and has an intake port 36 at its one side for taking in the secondary air from the air compressor 24 and multiple supplying ports 38 at its other end, where the number of the ports is the same as the number of the cylinders.

The location of each supplying port is equidistance from the center of the one end and each of the supplying ports is connected to the exhaust system through a distributing means 40, which includes multiple connections such as pipes or hoses.

It is preferable to locate the distributing means 40 near the exhaust valve because it is possible to mix the high temperature exhaust gas with the secondary air before the temperature of the gas is dropped and to expect high oxidation efficiency; to push the incomplete combustion gases, especially, gases containing highly concentrated HC emitted at the end of the exhaust stroke, into the combustion chamber by the pressure of the secondary air.

For example, the connection of the distributing means to the exhaust system is attained by connecting each distributing means to a hole provided in each of branches 11 of the exhaust manifold or to a hole provided in the exhaust port of the engine head.

If the engine has two exhaust valves for one cylinder, it is possible to diverge the respective distributing means and to connect each diverged distributing means with respect to each exhaust valve.

The rotating body 30 is rotatably fitted to inside of the housing 28 and is provided with a circumferential groove 42 defined along the circumference thereof, which is in face with the intake port 36 so that the secondary air taken in through the intake port 36 is directly supplied along the groove 42 to a hole 44 as shown in FIGS. 2 and 3.

In the circumferential groove 42, the communicating hole 44 which passes through the inner part of the rotating body is formed to communicate the intake port 36 with one of the supplying ports 38 as shown in FIGS. 2 and 3.

The groove 42 plays a role to guide the secondary air taken in through the intake port 36 to the communicating hole 44.

The communicating hole 44 is sequently connected to the corresponding supplying port according to the corresponding engine cylinder combustion.

Accordingly, the outlet portion of the communicating hole 44 should be located to be connected to the inlet portion of the corresponding supplying port 38 in accordance with the rotation of the body 30.

Figure 4:
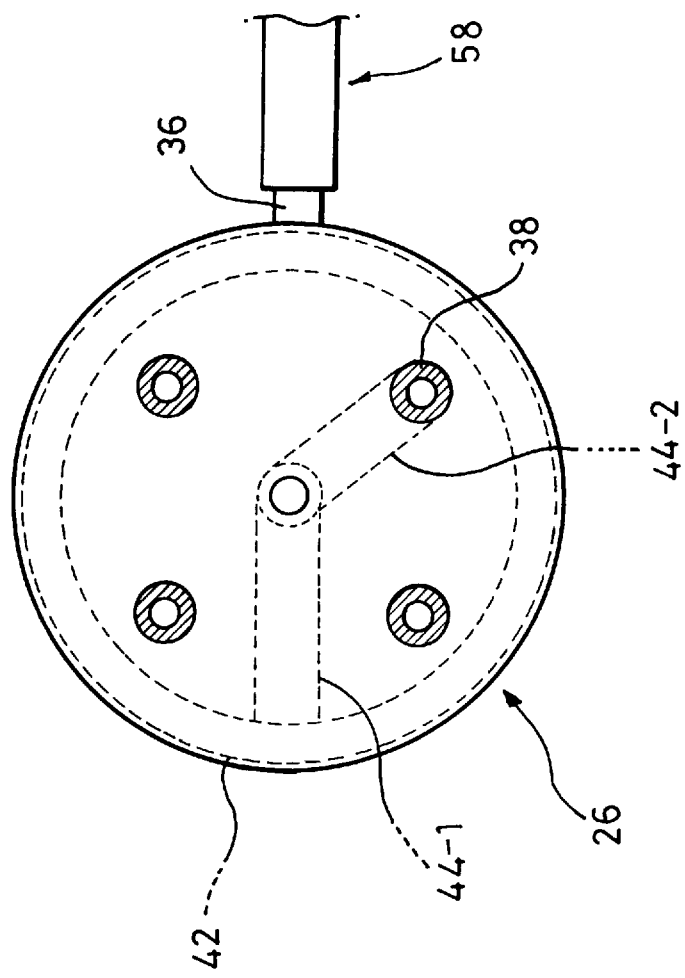
FIG. 4 is a plan view of the above distributor.

FIGS. 3 and 4 show such example. Firstly, a communicating hole 44-1 is formed horizontally to the center of the body 30, then, a communicating hole 44-2 is formed toward one of the supplying port from the end of the communicating hole 44-1, that is, the center of the body 30.

Since each of the supplying ports is equidistance from the center, the communicating hole 44 is connected to each of the supplying ports in turn according to the rotation of the body 30.

The body 30 rotates to connect the communicating hole 44 to the supplying port for the cylinder in the exhaust stroke sequently according to the sequence of engine combustion.

The constitution for this purpose is shown in FIGS. 1 to 3.

The rotating body 30 has shafts 46 and 48 for rotating with respect to the housing 28. The lower cover 32 is attached to the housing 28 for covering the open end of the housing 28, by means of, for example, screws. The shaft 48 protrudes through the lower cover hole 50 and a pulley 34 is mounted on it. The pulley 34 is engaged to an engine crank shaft pulley 54 by means of a power transmitting means such as a belt 56.

At this time, the radius of the pulley 34 should be determined to satisfy the condition that the body 30 can be rotated in order to sequently connect the communicating hole 44 with the supplying port for the cylinder in exhaust stroke according to the sequence of engine combustion.

For example, for the 4 stroke engine as shown in FIG. 1, the body 30 has 1 revolution if the engine crank shaft rotates 2 times.

The driving means for rotating the rotating body 30 in accordance with the sequence of engine combustion to sequently connect the communicating hole to the supplying port with respect to the cylinder in which the combustion takes place is not limited to the pulley system mentioned above. For example, it is possible to use a gear system.

Therefore, the secondary air produced in the air compressor is supplied to the distributor 26. The distributor 26 distributes the secondary air to the corresponding exhaust system for the cylinder in the exhaust stroke according to the corresponding exhaust valve timing so that the incomplete combustion gases containing HC, CO, NOx etc are uniformly mixed with the secondary air. In addition, the pressure of the injected secondary air pushes the incomplete combustion gases, especially, gases containing high concentrated HC which are emitted at the end of the exhaust stroke, into the combustion chamber. As a result, highly effective oxidation is accomplished and reducing the emissions, especially HC gases, is attained.

With this, the object of the invention can be achieved, However, it is possible to further include a pressure control valve 60 provided in the passage 58 connecting the air compressor 24 with the distributor 26. Moreover, it is possible to further include check valves 62 provided in the distributing means 40, as shown in FIG. 1.

The pressure control valve 60 adjusts the secondary air pressure for compensating the amount of the secondary air in accordance with the engine condition, for example, the engine RPM and the amount of intake air, and is controlled by the ECU 22.

Figure 7A:
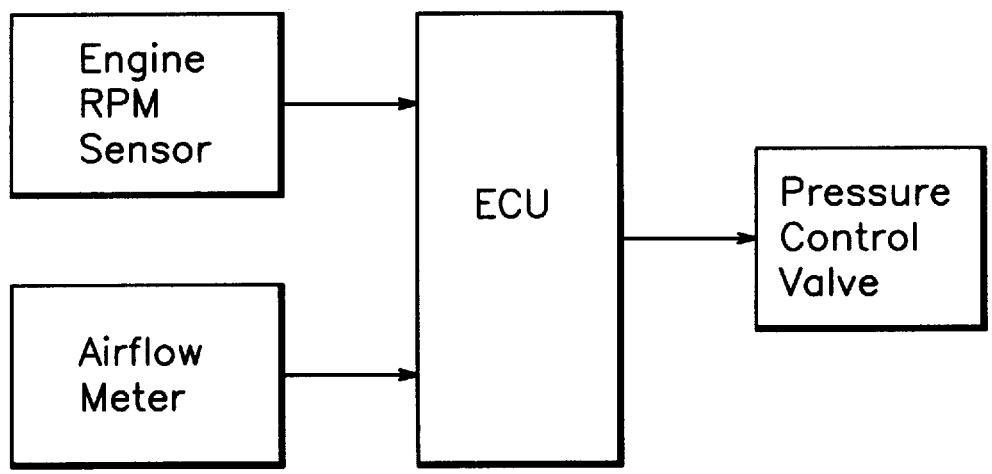
FIG. 7(A) is a block diagram showing the flow of a control signal for controlling a pressure control valve in the first or second embodiment.

As an example, an air flowmeter and an engine RPM sensor sense the amount of the intake air and an engine RPM, respectively, and the ECU receives the sensed signals and controls the pressure control valve as shown in FIG. 7(A).

The respective check valves 62 are provided for preventing a rearward flow of the exhaust gases to the distributing means 40 when there is no injection (or supplying) of the secondary air through the distributor 26.

Figure 5:
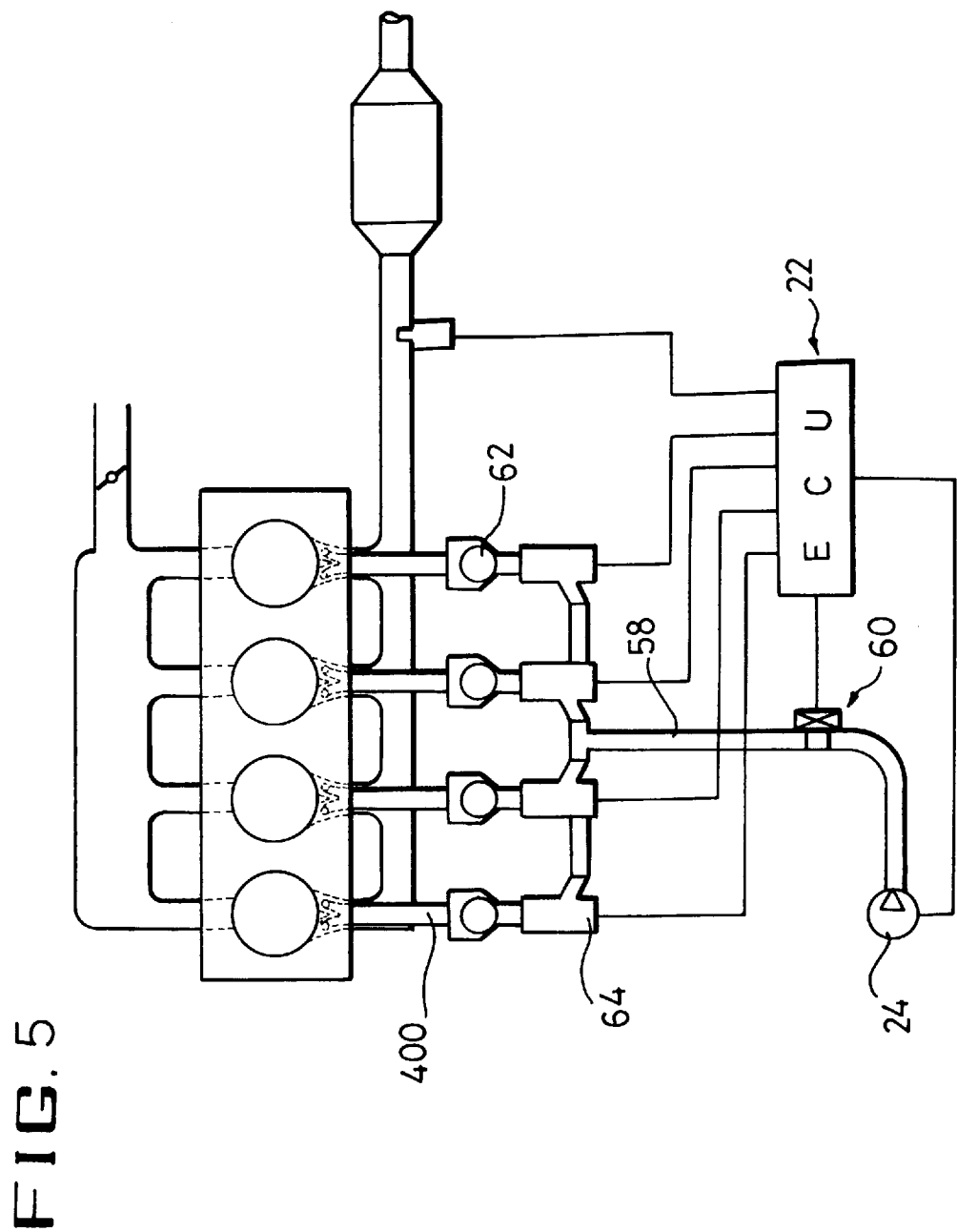
FIG. 5 is a plan view showing an engine system to which a second preferred embodiment according to the invention is applied.
Figure 6:
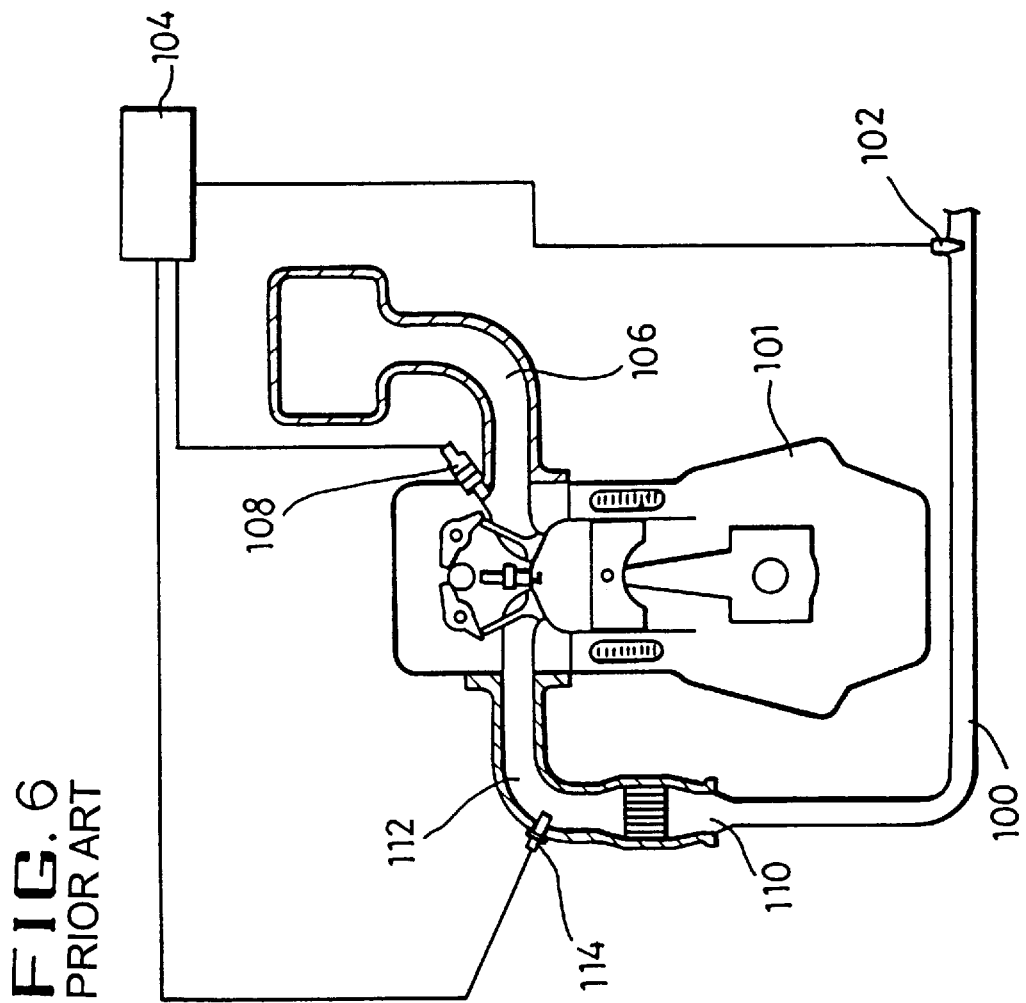
FIG. 6 is plan view showing a prior art.

A plurality of injectors 64 can be used instead of the distributor 26. FIG. 5 shows such example.

The distributing means 400 includes multiple connections such as pipes or hoses, each of which is diverged from the passage 58 connected with the air compressor 24. Each injector 64 is arranged in the inlet of each connection of the distributing means 400 as shown in FIG. 5.

Each injector 64 is controlled by ECU 22, and the injector corresponding to the cylinder in the exhaust stroke is operated to inject the secondary air while the corresponding exhaust valve is open according to the sequence of engine combustion.

Figure 7B:
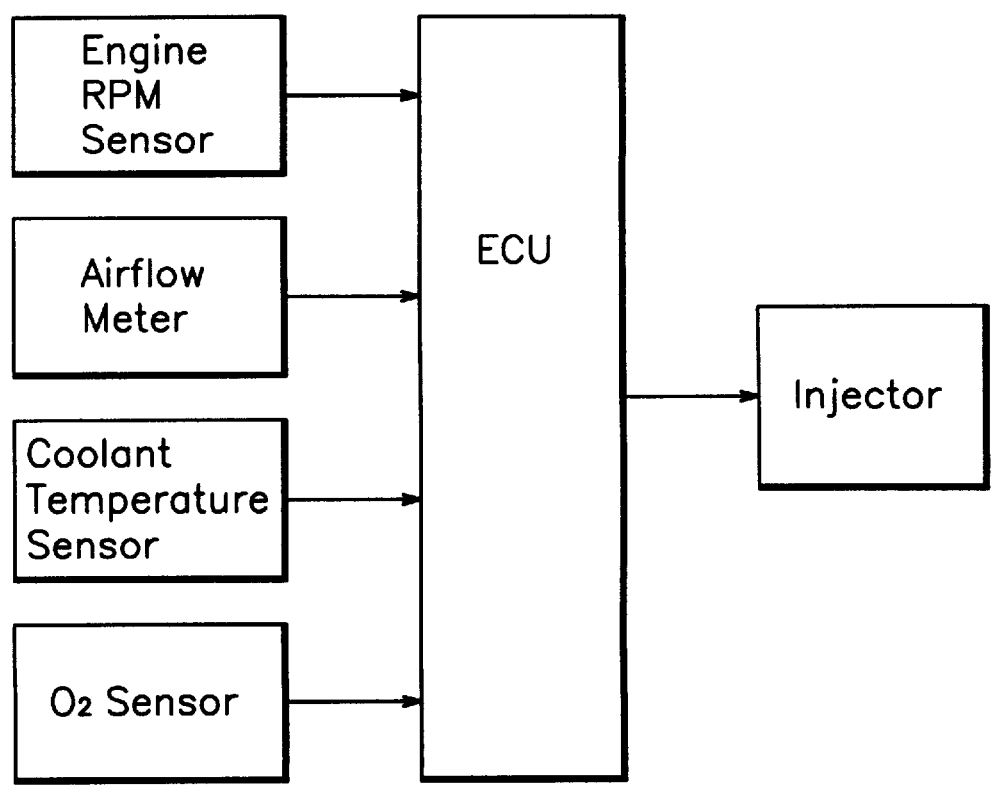
FIG. 7(B) is a block diagram showing the flow of a control signal for controlling each injector in the second embodiment.

The ECU 22 receives the signals representing the engine RPM, air to fuel ratio, the amount of engine intake air, and the coolant temperature from the engine RPM sensor, oxygen sensor, the air flowmeter and the coolant temperature sensor, respectively, and controls the secondary air injection proportional to the amount of the engine intake air at the optimum injection timing as shown in FIG. 7(B).

That is, the optimum injection timing and injection duration according to the engine RPM and the amount of engine intake air are predeterminately mapped to the ECU 22 and accordingly the injector is controlled to inject the secondary air at optimum conditions. The optimum condition may be determined by the engine experiment.

The reason for measuring the amount of the engine intake air is that the amount of exhaust gases is proportional to the amount of intake air. Whether the engine is cold is determined, for example, by the coolant temperature, which is measured through the coolant temperature sensor.

In this case, it is possible to further include a pressure control valve 60 provided in the passage 58 and check valves 62 provided in the distributing means 400, as shown in FIG. 5.

The pressure control valve 60 is controlled by the ECU 22 to compensate the amount of the secondary air pressure according to the engine condition as shown in FIG. 7(A). Each of the check valves 62 is provided for preventing a rearward flow of the exhaust gases to the distributing means 400 when there is no injection of the secondary air through the injector 64.

Therefore, each injector 64 injects the secondary air produced in the air compressor in turn to the exhaust system for the cylinder in the exhaust stroke according to the exhaust valve timing of the cylinder at desired time and for desired duration and the sufficient mixing is obtained. As a result, highly effective oxidation is attained as well as pushing of the highly concentrated HC emitted at the end of the exhaust stoke to the combustion chamber by the pressure of the injected secondary air. Consequently, the reduced emissions are accomplished.

The descriptions in the above are only examples to which the invention is applied and the protection scope of the invention will be determined by the following claims.

What is claimed is:

1. A device for reducing emissions from a vehicle having an internal combustion engine, comprising:

an air compressor for producing secondary air;

a plurality of injectors for injecting the secondary air in an exhaust system of the engine;

a plurality of check valves for limiting flow of exhaust gas from the exhaust system to the injectors; and a control unit for operating the injectors when a respective exhaust valve of the engine opens after combustion in a cylinder of the engine.

2. The device as set forth in claim 1, further comprising a plurality of connections through which the secondary air flows, the connections being flow connected to a passage connected to the air compressor and each of the injectors being in a corresponding one of the connections.

3. The device as set forth in claim 1 or 2, further comprising a pressure control valve for adjusting pressure and amount of the secondary air according to conditions of the engine.

4. The device as set forth in claim 2, wherein each of the check valves is in a corresponding one of the connections, and wherein the device further comprises a pressure control valve for adjusting pressure and amount of the secondary air according to conditions of the engine.

* * * * *